United States Patent
Jefremov et al.

(10) Patent No.: US 8,245,266 B2
(45) Date of Patent: Aug. 14, 2012

(54) USER INTERFACE

(75) Inventors: Andrei Jefremov, Järfälla (SE);
Karlheinz Wurm, Tallinn (EE)

(73) Assignee: Skype, Dublin (IE)

( * ) Notice: Subject to any disclaimer, the term of this patent is extended or adjusted under 35 U.S.C. 154(b) by 728 days.

(21) Appl. No.: 12/004,470

(22) Filed: Dec. 20, 2007

(65) Prior Publication Data

US 2009/0089849 A1  Apr. 2, 2009

(30) Foreign Application Priority Data

Sep. 27, 2007  (GB) .................................. 0718980.6

(51) Int. Cl.
*H04N 7/14* (2006.01)
*H04N 5/445* (2006.01)
*H04N 7/173* (2006.01)
*G06F 3/00* (2006.01)
*G06F 13/00* (2006.01)

(52) U.S. Cl. .......... 725/133; 725/37; 725/105; 725/117; 348/14.01; 348/14.03; 348/14.12

(58) Field of Classification Search ....................... 725/37
See application file for complete search history.

(56) References Cited

U.S. PATENT DOCUMENTS

| | | |
|---|---|---|
| 7,099,280 B1 | 8/2006 | Shaffer et al. |
| 2003/0187610 A1* | 10/2003 | Dorrance et al. ............. 702/151 |
| 2004/0073641 A1 | 4/2004 | Minhazuddin et al. |
| 2004/0133697 A1 | 7/2004 | Mamaghani et al. |
| 2005/0094646 A1 | 5/2005 | Lee |
| 2005/0105491 A1* | 5/2005 | Chaskar et al. ............... 370/331 |
| 2005/0136897 A1* | 6/2005 | Praveenkumar et al. .. 455/414.1 |
| 2006/0020697 A1 | 1/2006 | Kelso et al. |
| 2006/0039346 A1 | 2/2006 | Shapiro |
| 2006/0045367 A1* | 3/2006 | Chao et al. ..................... 382/239 |
| 2006/0064729 A1* | 3/2006 | Steading .......................... 725/95 |
| 2007/0022185 A1* | 1/2007 | Hamilton et al. ............. 709/220 |
| 2007/0280139 A1* | 12/2007 | Sakai ............................. 370/254 |
| 2007/0294415 A1 | 12/2007 | Kelder et al. |

(Continued)

FOREIGN PATENT DOCUMENTS

EP  1 071 267 A2  1/2001

(Continued)

OTHER PUBLICATIONS

Notification of Transmittal of the International Search Report and the Written Opinion of the International Searching Authority, or the Declaration from International Application No. PCT/EP2008/053687, dated Mar. 23, 2009.

(Continued)

*Primary Examiner* — Justin Shepard
(74) *Attorney, Agent, or Firm* — Wolfe-SBMC

(57) ABSTRACT

A method of controlling quality of video data transmitted from a first user terminal to at least one other user terminal in a communication system includes detecting at said first user terminal a condition that indicates that the quality of the video data is below an acceptable threshold; automatically generating instructions based on the detected condition for a user of the first user terminal, said instructions intended to provide a humanly implementable remedy to improve the quality of the video data; outputting the instructions to the user in a humanly comprehensible form; and receiving an input from a user of the first user terminal responsive to the instructions to implement the remedy and thereby improve the quality of the video data.

23 Claims, 2 Drawing Sheets

U.S. PATENT DOCUMENTS

| | | | |
|---|---|---|---|
| 2008/0005626 A1* | 1/2008 | Schaff et al. | 714/48 |
| 2008/0068448 A1* | 3/2008 | Hansen | 348/14.09 |
| 2008/0168235 A1* | 7/2008 | Watson et al. | 711/135 |
| 2008/0181117 A1* | 7/2008 | Acke et al. | 370/236.2 |

FOREIGN PATENT DOCUMENTS

| | | |
|---|---|---|
| EP | 1 100 249 A2 | 5/2001 |
| EP | 1 235 416 A1 | 8/2002 |
| JP | 2002-185527 A | 6/2002 |
| JP | 2005-260384 A | 9/2005 |
| JP | 2007-228362 (A) | 9/2007 |
| WO | WO 2000/33511 A1 | 6/2000 |
| WO | WO 00/72536 A1 | 11/2000 |
| WO | WO 2004/045130 A2 | 5/2004 |
| WO | WO 2005/009019 A2 | 1/2005 |
| WO | WO 2007/125413 A2 | 11/2007 |

OTHER PUBLICATIONS

Ed Bott, "Faster Smarter Windows XP," *Microsoft Press, Redmond Washington* (2003).

Microsoft Windows XP, "Tech Net Help Center, Section Using the Help and Support Center," Windows XP Retail Date: Oct. 25, 2001.

U.S. Appl. No: 11/799,453, Office Action dated Mar. 19, 2010, 16pp.

U.S. Appl. No: 11/799,453, Final Office Action dated Sep. 2, 2010, 16 pp.

International Search Report, International Application No. PCT/US2007/001185, Date of Search Sep. 25, 2007; 2 pages.

Great Britain Search Report, Great Britain Application No. GB0608627.6; Date of Search Aug. 23, 2007, 1 page.

U.S. Appl. No. 11/799,453; Office Action dated Jan. 4, 2012. 14 pages.

* cited by examiner

USER INTERFACE

RELATED APPLICATION

This application claims priority under 35 U.S.C. §119 or 365 to Great Britain, Application No. 0718980.6, filed Sep. 27, 2007. The entire teachings of the above application are incorporated herein by reference.

TECHNICAL FIELD

The present invention relates to a method for handling video call quality in a communication system.

BACKGROUND

Communication systems link together two communication devices so that the devices can send information to each other in a call or other communication event. Information may include voice, text, images or video.

One such communication system is a peer to peer system, in which a plurality of end users can be connected for communication purposes via a communications structure such as the internet. The communications structure is substantially decentralised with regard to communication route switching therein for connecting the end users. That is, the end users can establish their own communication routes through the structure based on exchange of one or more authorisation certificates (user identity certificates—UIC) to acquire access to the structure. The structure includes an administration arrangement issuing the certificates to the end users. Such a communication system is described in WO 2005/009019.

Peer-to-peer systems and other communication systems that use the internet or any other packet switched network employ voice over IP (internet protocol) protocols (VoIP) to transmit data. These systems are commonly referred to as VoIP systems. VoIP systems are beneficial to the user as they are often of significantly lower cost than communication networks, such as fixed line or mobile networks, otherwise referred to as public switched telephone networks (PSTN). This may particularly be the case for long distance calls.

Communication systems employing VoIP, or similar protocols are subject to many factors which may adversely affect call quality. For example, data packets may be lost when communication data is transmitted across the network, thereby affecting call quality. If the round trip time (RTT) for the data to be transmitted between users is great, a user may experience delay in receiving information.

Call quality may also be affected by factors attributable to the device on which the user receives data. For example if the device is a personal computer (PC), the number of applications running will affect the degree to which the central processing unit (CPU) may process communication data, thereby affecting call quality.

Poor call quality can be frustrating for a caller, and can cause him to seek alternative communication methods.

This problem is particularly apparent during video calls where video data is transmitted during the call. This is due to the high demands that transmitting video data places on network and device resources compared to transmitting voice data.

One known solution for improving call quality when video data is being transmitted is to instruct the user to close the video application during the call, such that only voice data is thereafter transmitted during the call. This solution allows greater CPU resources to be dedicated to the transmission of voice data thereby improving the quality of the transmission of voice data.

This solution requires the user to close the video application during the call. As such the only way the user may improve the call quality is by stopping the transmission of video data. This may not be a satisfactory solution for the user as the user may require that video data is transmitted during the call.

It is therefore an aim of embodiments of the invention to improve the quality of the transmission of video data during a video call.

SUMMARY

According to a first aspect of the present invention there is provided a method of controlling quality of video data transmitted from a first user terminal to at least one other user terminal in a communication system, the method comprising the steps of: detecting at said first user terminal a condition that indicates that the quality of the video data is below an acceptable threshold; automatically generating instructions based on the detected condition for a user of the first user terminal, said instructions intended to provide a humanly implementable remedy to improve the quality of the video data; outputting the instructions to the user in a humanly comprehensible form; and receiving an input from a user of the first user terminal responsive to the instructions to implement the remedy and thereby improve the quality of the video data.

According to a second aspect of the present invention there is provided a user device in a communication system, said user device having means for transmitting video data to at least one other device in the communication system, the user device comprising means for: detecting a condition that indicates that video data quality is below an acceptable threshold; means for automatically generating instructions based on the detected condition for a user of the at least one node, said instructions intended to provide a humanly implementable remedy to improve the video data quality; means for outputting the instructions to the user in a humanly comprehensible form; and means for receiving input from a user of the user device responsive to the instructions to implement the remedy and thereby improve the video data quality.

According to a third aspect of the present invention there is provided a computer program product comprising program code means which when executed by a computer implement the steps according to the method of any of claims 1 to 20.

In particular the invention relates, but not exclusively to providing an interface to enable a caller to control the video call quality.

BRIEF DESCRIPTION OF THE DRAWINGS

For a better understanding of the present invention and to show how the same may be carried into effect, embodiments of the present invention will now be described with reference to the following drawings.

DETAILED DESCRIPTION

Figure 1:
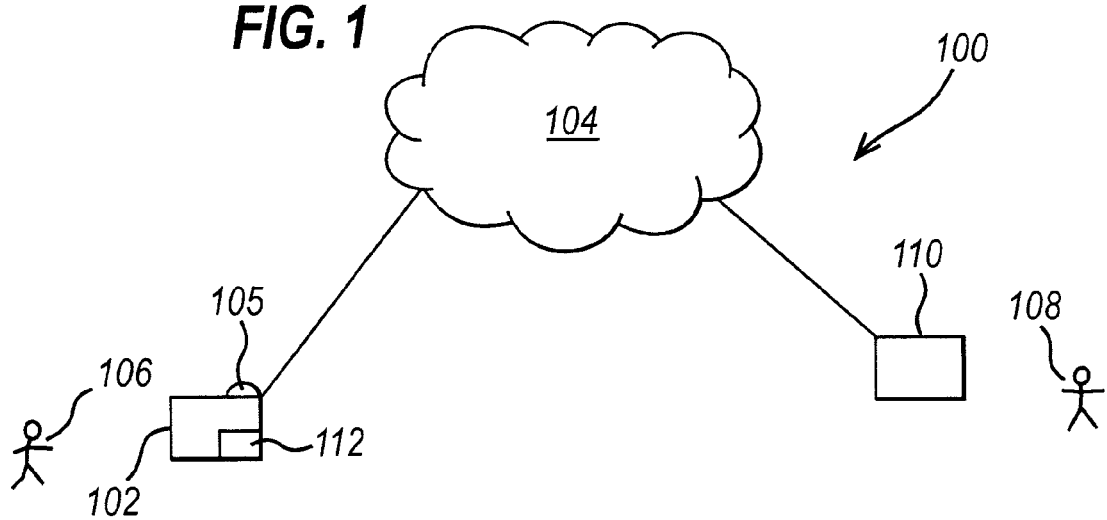
FIG. 1 is a schematic representation of a communication system.

Reference will first be made to FIG. 1, in a communication network 100. The communication network includes network 104 such as the Internet. In a preferred embodiment of the invention data may be transmitted via the network 104 using a peer to peer system. It should be appreciated however that even though the exemplifying system shown and described in more detail uses the terminology of a peer to peer system, embodiments of the present invention can be used in any other suitable form system capable of transmitting data over a network.

A user terminal 102 is shown connected to the network 104. The user terminal may be, for example, a personal computer, a gaming device, a personal digital assistant, a suitably enabled mobile phone, a television or other device able to connect to the network 104. The user terminal 102 is connected to the network 104 via a network port 105, and may be via a cable (wired) connection or a wireless connection.

Figure 2:
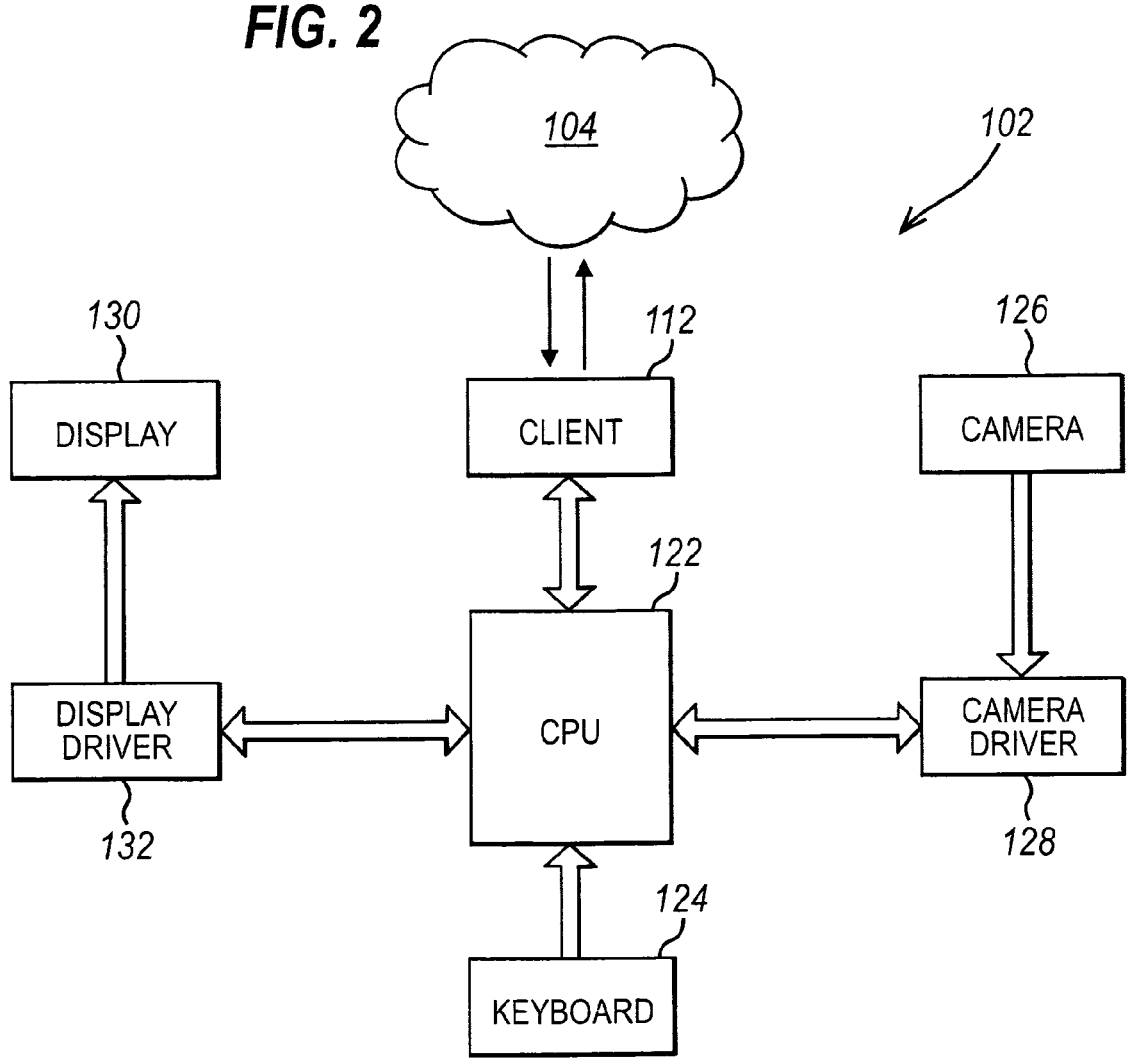
FIG. 2 shows a user device according to an embodiment of the present invention.

FIG. 2 is a diagram of the user terminal 102 in more detail. The user terminal 102 comprises client software 112, a CPU 122, a keyboard 124, a camera 126, a camera driver 128, a display 130, and a display driver 132.

The client software 112 is executed on the CPU 122 in the user terminal 102 and is used to connect to the peer to peer system operating on the internet 104. A user interface of terminal 102 such as the display 130 may be controlled by the client software program 112, hereinafter referred to as the client, to display user facilities and to indicate events occurring, such as an incoming call. According to an embodiment of the invention the client 112 may also be arranged to display instructions as will be described hereinafter.

The camera 126 is used to capture video data to be transmitted via the internet during a video call. The camera driver 128 is executed on the CPU 122 and is used to operate the camera 126. The camera is connected to the camera driver 128 via a universal serial bus port (USB port).

The display is used to display video data received from another user device during a video call with the other user device. The display is also used to display events and humanly readable instructions generated by the client 112. The display is controlled by the display driver 132 executed on the CPU 122.

The client 112 has a number of different components or layers for implementing various functions, including a protocol layer 402 (FIG. 3) for managing the network interface. In one embodiment of the invention the protocol layer may be used to monitor the some of the video call quality parameters.

Figure 3:
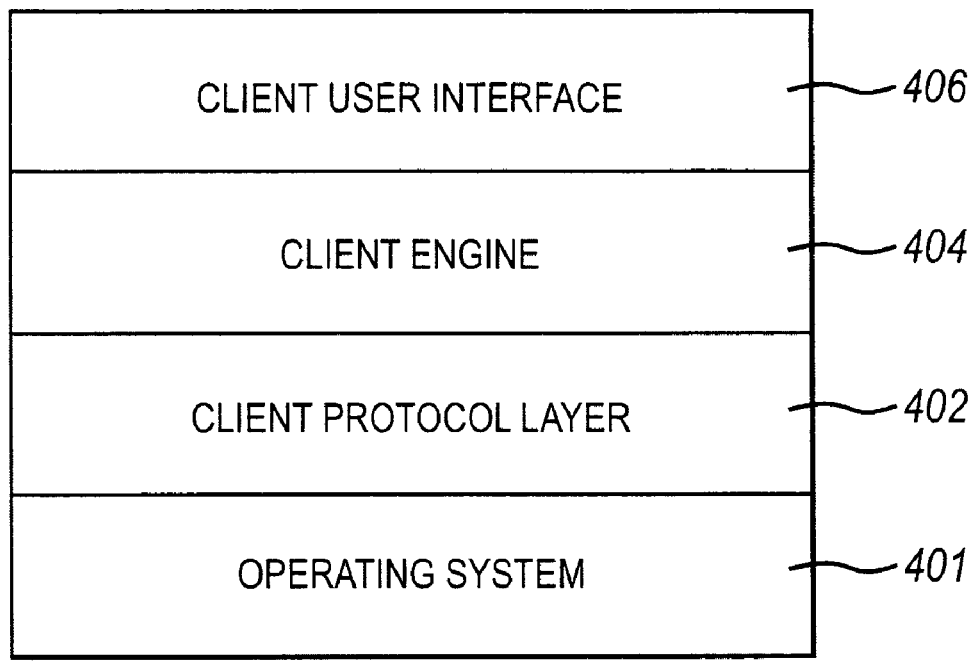
FIG. 3 is a schematic representation of a client stack.

FIG. 3 shows a client stack according to an embodiment of the present invention. As shown the client protocol layer sits on top of the operating system 401 of the device. Above the protocol layer 402 is the client engine 404. The client engine 404 is used to control the client user interface layer 406. The client user interface layer controls the user interface of the device. For example the client user interface layer is arranged to control the operation of the display 130 via the display driver 132. The control of the client user interface 406 will be explained in more detail hereinafter.

A user of a second user terminal 110 can make a video call to the user of the user terminal 102 across the network 104. To initiate the video call, the second user 108 can click on the contact listed for the user 106 operating terminal 102 displayed in a client running on the second user terminal 110 similar to the client running on the user terminal 102. Alternatively the user 108 can type in a number or username for the user 106. The client then sets up the video call to the user 106. The call may be made using VoIP, in accordance with methods known in the art, such as disclosed in WO 2005/009019. The video call may comprise a combination of video data with any of voice, instant messaging ("IM") or short message service (SMS) data.

In an alternative embodiment the second user terminal 110 may be connected to a different network such as a mobile network (not shown in FIG. 1) capable of transmitting video data. If connected to a mobile network, the second user terminal may be a mobile device.

In an embodiment of the invention the client 112 provided on terminal 102 is arranged to monitor at the terminal at least one parameter indicative of video call quality. The parameter monitored may be dependent on the type of user terminal.

According to one embodiment of the invention the client monitors the USB bandwidth available to the camera 126 as reported by the camera driver 128. The camera driver may be arranged to monitor the USB bandwidth available to the camera 126. If the available bandwidth falls below an optimal USB bandwidth the camera driver 128 is arranged to report that the USB bandwidth is below an optimal bandwidth to the client 112.

According to an embodiment of the invention, if the camera driver 128 reports that the USB bandwidth is below an optimal bandwidth, the client 112 may be arranged to determine that the video call quality is poor. The client may be arranged to report the poor video call quality to the user and provide the user with instructions to remedy the situation.

Figure 4:
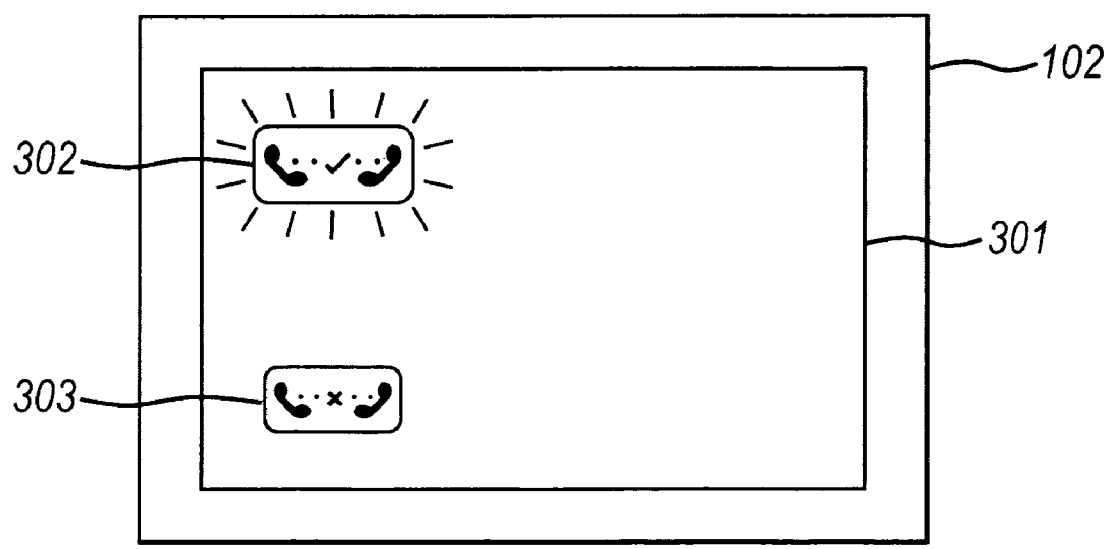
FIG. 4 is a schematic representation of a display screen according to an embodiment of the present invention.

In one embodiment of the invention the client engine is arranged to control the user interface to display a video call quality indicator. This may appear as an icon, otherwise referred to as a graphic button 302, 303 on a display screen 301 of the terminal 102 as shown in FIG. 4.

If the client engine receives notification from the client protocol layer that the USB bandwidth is below an optimal bandwidth, the client engine will control the client user interface to display a graphic button 303 indicating that the video call quality is poor.

The client engine may also be arranged to control the client user interface to display a help text message, in a window, notifying the user of how to remedy the problem. In the case where the user device is a PC, this may be accessed by the user selecting the graphic button 303 using a mouse. Alternatively the message may be displayed automatically, together with the video call quality indicator. The message may for example state that:

'You're not sending great video right now because you're using other USB devices. Try disconnecting them or try connecting your webcam to an alternative USB port.'

In an alternative embodiment of the invention the client engine may be arranged to control the client user interface to run an audio message to the user using a speaker in the device describing how to remedy the problem.

Accordingly the user may disconnect other USB devices, or connect the camera to an alternative USB port in order to achieve a better video call quality.

In an embodiment of the invention it is possible to select the degree of technical detail described in the help message provided to the user. For example the user may be able to select whether or not he or she wants a detailed message by selecting an option provided in a window which is displayed when the user selects the graphic button. Alternatively the user may select an advanced help option in the window showing the original help message. In the case where the problem with the communication is detected as being due to the USB bandwidth being below an optimal bandwidth the advanced message may state for example that:

'If you have connected your webcam via a USB hub, consider changing to a direct USB connection on your computer to improve video quality.'

According to a further embodiment of the invention the camera driver may be arranged to report to the client if the USB bandwidth available to the camera has fallen below a level that is required for the camera to operate.

If the camera driver 128 reports that the USB bandwidth is below a level required for the camera to operate, the client 112 may be arranged to determine that the that the camera is unable to provide video call data. The client may be arranged to report this to the user and provide the user with instructions to remedy the situation. The instructions displayed to the user may for example state that:

'Your webcam's not working properly because you're using other USB devices. Try disconnecting them or connect your webcam to an alternative USB port'.

According to a further embodiment of the invention the client 112 monitors light level as reported by the camera driver 128. The camera driver may be arranged to monitor the level of light input into the camera 126. This may be achieved by measuring the intensity of the signal received from the camera 126. If the light level falls below an threshold value the camera driver 128 is arranged to report that the light level is below the threshold value to the client 112.

According to an embodiment of the invention, if the camera driver 128 reports that the light level is below a threshold value, the client 112 may be arranged to determine that the that the light in the vicinity of the camera is too low. The client may be arranged to report this to the user and provide the user with instructions to remedy the situation. The instructions displayed to the user may for example state that:

'You're not sending great video right now because the light in your room is quite low. Increase the light level to send a clearer picture.'

Accordingly the user may increase the level of light input into the camera in order to achieve a better video call quality.

According to one embodiment of the invention the client may be arranged to additionally or alternatively monitor the proportion of the CPU of terminal 102 that is used in handling the communication with user terminal 110. The client may also be arranged to additionally monitor the usage of the CPU by other applications that are not involved in handling the communication. The amount that the CPU is used by applications associated with the video call may then be compared to the usage of the CPU by other applications in order to determine if there is a sufficient proportion of the CPU dedicated to handling the communication. The client may determine that there is a sufficient proportion of the CPU dedicated to handling the communication by comparing the monitored amount to a predefined threshold amount.

In one embodiment of the invention, the bit rate of the video data and the required resolution of the video data may also be used to determine if there is a sufficient proportion of the CPU dedicated to handling the video call.

According to an embodiment of the invention, if it is determined that an insufficient proportion of the CPU is dedicated to handling the video call, the client may be arranged to control the user interface to indicate to the user that the communication quality is poor. The user may then be prompted to remedy the situation. In accordance with an embodiment of the invention the client may also provide the user with instructions for remedying the situation.

If the client engine receives notification from the client protocol layer that an insufficient proportion of the CPU is dedicated to handling the video call, the client engine will control the user interface to display a graphic button 303 indicating that the video call quality is poor.

The client engine may also be arranged to control the user interface to display a help text message notifying the user of how to remedy the problem. The message may for example state that:

'You may be experiencing poor video quality because you seem to be running a lot of programs on your computer. Try closing some of them and stopping any downloads to free up more space on your computer.'

Accordingly the user may close other applications and terminate any downloads in order to achieve a better video call quality.

In the case where the problem with the communication is detected as being due to usage of the CPU by other applications the advanced message may list the applications that are using a high proportion of the CPU.

The client running on the second user terminal 110 which the first user terminal 102 is in communication with may be arranged to display a message to user 108 indicating that the first user terminal is experiencing communication problems. This can be communicated to the second user terminal 110 via the communications protocol.

If the client running on the first user terminal 102 detects that the CPU usage on the first terminal is high the client running on the first terminal 102 may be arranged to report this to the client running on the second user terminal 110. In response to receiving the report, the client engine of the client running on the second user terminal 110 is arranged to control the user interface of the second user terminal 110 to display a text message explaining the problem, for example the message may state:

'Video not great? The person you are talking to has a slow running computer at the moment which might be causing some problems'

According to another embodiment of the invention the client may determine whether the user terminal is operating in battery saving mode. Battery saving modes are implemented on battery operated devices such as laptops to restrict the operation of the device in order to limit the power consumption of the device. Ordinarily, when a device operates in battery saving mode, the operation of the CPU is restricted. This will affect the video call quality.

If the client engine receives notification from the client protocol layer that the device is operating in battery saving mode the client engine may control the user interface to display a graphic button 303 indicating that the video call quality is poor.

The client engine may also be arranged to control the user interface to display a help text message instructing a user notifying the user of how improve the video call quality when the device is operating in a battery saving mode. The message may for example state that:

'You may be experiencing problems with Video call quality because your laptop seems to be in power saving mode. Change your computer to AC power or switch your computer to maximum performance.'

In a preferred embodiment of the invention the client engine will also control the user interface of the first user device 102 to display a button or link on the screen for receiving an instruction from the user to switch the computer to maximum performance.

If the client running on the first user terminal 102 detects that the first terminal is operating in a battery saving mode, the client running on the first terminal 102 may be arranged to report this to the client running on the second user terminal 110. In response to receiving the report, the client engine of the client running on the second user terminal 110 is arranged to control the user interface of the second user terminal 110 to display a text message explaining the problem, for example the message may state:

'Video not great? The person you are talking to has a slow running computer at the moment which might be causing some problems'

According to a further embodiment of the invention the client is arranged to monitor the packet loss for the communication. Packet loss may be monitored by keeping track of the number of packets sent, and periodically receiving information from the other party indicating the number of packets received. By comparing these two numbers, it is possible to deduce the number of packets lost in communication, and calculate the packet loss as the ratio between packets lost and packets sent.

If it is determined the packet loss exceeds a threshold, the client may be arranged to control the user interface to indicate to the user that the communication quality is poor. In accordance with an embodiment of the invention the client may also provide the user with instructions for remedying the situation.

If client engine receives notification from the client protocol layer that the loss of data packets is too high, the client engine will control the user interface to display a graphic button 303 indicating that the video call quality is poor.

The client engine may also be arranged to control the user interface to display a help text message, in a window, notifying the user of how to remedy the problem. The message may for example state that:
'You may be experiencing vide call quality problems. Closing other applications may improve your call quality.'

The client running on the second user terminal which the first user terminal 102 is in communication with may be arranged to display a message indicating that the first user terminal is experiencing communication problems.

According to a further embodiment of the invention the client is arranged to detect the local NAT (Network Address Translation) router involved in the video call.

Two NAT types will be referred to herein: suitable and unsuitable, expressed in relation to send quality communications between computers.

If it is determined the local NAT type is unsuitable, the client may be arranged to control the user interface to indicate to the user that the video quality is poor. In accordance with an embodiment of the invention the client may also provide the user with instructions for remedying the situation.

If client engine receives notification from the client protocol layer that the local NAT type is unsuitable, the client engine will control the user interface to display a graphic button 303 indicating that the video call quality is poor.

The client engine may also be arranged to control the user interface to display a help text message notifying the user of how to remedy the problem. The message may for example state that:
'You may be experiencing video call problems. Please redialfor better quality.'

In the case where the problem with the communication is detected as being due the detected NAT type the advanced message may state for example that:
'Your video calls are relayed through the internet. Video call quality could be poor if your router configuration prevents the application handling your video call from achieving the optimum relay for video calls. For better call quality you could change your firewall or router settings. An online guide will help you do this, or you can seek the help of your system administrator.'

The client running on the second user terminal which the first user terminal 102 is in communication with may be arranged to display a message indicating that the first user terminal is experiencing communication problems.

The user of terminal 102 may then either redial immediately or change firewall and router settings of the device before redialling in order to improve the quality of the video call with the user of terminal 110.

According to a further aspect of the invention the client is arranged to detect whether or not the received data stream is direct User Datagram Protocol UDP in addition to detecting the local NAT router type.

If it is determined that the received data stream is not direct UDP and the local NAT type is detected as being unsuitable, the client may be arranged to control the user interface to indicate to the user that the video call quality is poor. In accordance with an embodiment of the invention the client may also provide the user with instructions for remedying the situation.

If client engine receives notification from the client protocol layer that the received data stream is not direct UDP and the local NAT type is detected as being unsuitable, the client engine will control the user interface to display a graphic button 303 indicating that the video call quality is poor.

The client engine may also be arranged to control the user interface to display a help text message notifying the user of how to remedy the problem. The message may for example state that:
'If you are experiencing call problems this may be because your video call application may have restricted access to the internet. Please review your firewall or security settings to ensure that the video call application is not restricted from accessing the internet.'

Alternatively the user may select an advanced help option in the window showing the original help message. In the case where the problem with the video call is detected as being due the detected NAT type the advanced message may direct the user to an website which provides information on how to remedy the problem. The message may state for example that:
'To learn more about changing your firewall settings please consult our online guide to firewalls. Our guide will tell you how to optimise your settings.'

The client running on the second user terminal which the first user terminal 102 is in communication with may be arranged to display a message indicating that the first user terminal is experiencing communication problems.

The user of terminal 102 may then either redial immediately or change firewall and router settings of the device before redialling in order to improve the quality of the video call with the user of terminal 110.

According to a further embodiment of the invention the client is arranged to monitor the local bandwidth of the network connection.

If it is determined that the local detected bandwidth is below a predefined threshold, for example less than 150 Kb/sec (Yellow) or 45 Kb/sec (Red) the client may be arranged to control the user interface to indicate to the user that the video call quality is poor. In accordance with an embodiment of the invention the client may also provide the user with instructions for remedying the situation.

If client engine receives notification from the client protocol layer that the local bandwidth of the network connection is too low, the client engine will control the user interface to display a graphic button 303 indicating that the call quality is poor.

The client engine may also be arranged to control the user interface to display a help text message notifying the user of how to remedy the problem. The message may for example state that:

'You may be experiencing problems with video due to slow internet connection. Try closing other applications that use the internet, or consider getting a broadband connection.'

In the case where the problem with the video call is detected as being due slow internet connection the advanced message may state for example that:

'Recommended bandwidth for video calls is 512 Kb/sec downstream 256 Kb/sec and upstream (ADSL). Closing other applications that use internet may improve the video quality.'

Accordingly the user can review their network connection and switch to a broadband connection for better call quality.

If the client running on the first user terminal 102 detects that the first terminal has a low bandwidth connection, the client running on the first terminal 102 may be arranged to report this to the client running on the second user terminal 110. In response to receiving the report, the client engine of the client running on the second user terminal 110 is arranged to control the user interface of the second user terminal 110 to display a text message explaining the problem, for example the message may state:

'Video quality not great? The person you're talking to has a slow internet connection which might be causing some problems.'

In an alternative embodiment of the present invention the user terminal may be arranged to transmit video data to a plurality of user devices, or to a conference host in a video conference call.

While this invention has been particularly shown and described with reference to preferred embodiments, it will be understood to those skilled in the art that various changes in form and detail may be made without departing from the scope of the invention as defined by the claims.

What is claimed is:

1. A method of controlling quality of video data transmitted from a first user terminal to at least one other user terminal in a communication system, the method comprising the steps of:
   improving quality of the video data transmitted over an existing connection from a first user terminal to at least one other user terminal by:
   transmitting the video data from a first user terminal to the at least one other user terminal via the existing connection from the first user terminal;
   providing instructions for each of a plurality of conditions indicating that the quality of the video data transmitted from the first user terminal via the existing connection is below an acceptable threshold;
   detecting at said first user terminal at least one of a plurality of conditions that indicates that the quality of the video data transmitted from the first user terminal via the existing connection is below an acceptable threshold;
   automatically generating instructions based on the detected condition for a user of the first user terminal, said instructions notifying the user of how to remedy a problem due to the detected condition and intended to provide a humanly implementable remedy to the problem to improve the quality of the video data transmitted from the first user terminal;
   automatically outputting the automatically generated instructions to the user in a humanly comprehensible form; and
   receiving an input from a user of the first user terminal responsive to the automatically generated instructions to implement the remedy and thereby improve the quality of the video data transmitted from the first user terminal.

2. A method as claimed in claim 1 further wherein the video data transmitted from the first user terminal is captured for transmission by a camera connected to said first user terminal.

3. A method as claimed in claim 2 wherein the detected condition relates to a characteristic of the video data received from the camera.

4. A method as claimed in claim 2 wherein the camera is connected to the first user terminal via a USB connection.

5. A method as claimed in claim 4 wherein the condition relates to an available bandwidth of the USB connection between the camera and the first user terminal.

6. A method as claimed in claim 5 wherein the step of detecting at said first user terminal a condition that indicates that the quality of the video data is below an acceptable threshold comprises detecting that the available bandwidth is below a predetermined threshold.

7. A method as claimed in claim 6 wherein if it is detected that the available bandwidth is below a predetermined threshold the user is instructed to increase the available bandwidth of the USB connection between the camera and the first user terminal.

8. A method as claimed in claim 2 wherein the condition relates to the intensity of light in the video data captured by the camera.

9. A method as claimed in claim 8 wherein the step of detecting at said first user terminal a condition that indicates that the quality of the video data is below an acceptable threshold comprises detecting that the intensity of light in the video data captured by the camera is below a predetermined threshold.

10. A method as claimed in claim 9 wherein if a condition is detected that the intensity of light in the video data is below a predetermined threshold the user is instructed to increase the light captured by the camera.

11. A method as claimed in claim 1 wherein the step of detecting at said first user terminal a condition that indicates that the quality of the video data is below an acceptable threshold comprises detecting that a capacity of a processor used to process the video data at the first user terminal is below a predetermined threshold.

12. A method as claimed in claim 11 wherein if it is detected that the capacity of the processor used to process the video data at the first user terminal is below the predetermined threshold the user is instructed to close any applications running on the processor that are not involved in handling a communication associated with the transmission of the video data.

13. A method as claimed in claim 1 wherein the step of detecting at said first user terminal a condition that indicates that the quality of the video data is below an acceptable threshold comprises detecting that a bandwidth of a connection between the first user terminal and the communication system is below a predetermined threshold.

14. A method as claimed in claim 13 wherein if it is detected that the bandwidth of the connection between the first user terminal and the communication system is below a predetermined threshold the user is instructed to close any applications that use the connection between the first user terminal and the communication system that are not involved in handling a communication associated with the transmission of the video data.

15. A method as claimed in claim 1 wherein the condition relates to the type of router used in the transmission.

16. A method as claimed in claim 1 wherein the humanly comprehensible instructions are displayed in humanly comprehensible text form.

17. A method as claimed in claim 1 wherein the humanly comprehensible instructions are output in humanly comprehensible audible form.

18. A method as claimed in claim 1 wherein the remedy is a physical act carried out by the user.

19. A method as claimed in claim 1 wherein when if a condition is detected at the first user terminal that indicates that the quality of the video data is below an acceptable threshold, information is provided to the at least one other user terminal indicating a poor quality condition.

20. A method as claimed in claim 1 wherein the communication system is a packet switched communication system.

21. A method as claimed in claim 1 wherein automatically outputting the automatically generated instructions in response to receiving an indication of poor video quality.

22. A user device in a communication system, said user device having means for transmitting video data to at least one other device in the communication system, the user device comprising:
   means for improving quality of the video data transmitted over an existing connection from a first user terminal to at least one other user terminal by:
   means for transmitting the video data from a first user terminal to the at least one other user terminal via the existing connection from the first user terminal;
   means for providing instructions for each of a plurality of conditions indicating that the quality of the video data transmitted from the first user terminal via the existing connection is below an acceptable threshold;
   means for detecting at least one of the plurality of conditions that indicates that video data quality is below an acceptable threshold;
   means for automatically generating instructions based on the detected condition for a user of the at least one node, said instructions notifying the user of how to remedy a problem due to the detected condition and intended to provide a humanly implementable remedy to the problem to improve the quality of the video data transmitted to the at least one other device;
   means for automatically outputting the automatically generated instructions to the user in a humanly comprehensible form; and
   means for receiving input from a user of the user device responsive to the automatically generated instructions to implement the remedy and thereby improve the quality of the video data transmitted to the at least one other device.

23. A computer program product comprising program code stored on a non-transitory storage medium, which when executed by one or more processors causes the one or more processors to control quality of video data transmitted from a first user terminal to at least one other user terminal in a communication system, the computer program product having program code that:
   improves quality of the video data transmitted over an existing connection from a first user terminal to at least one other user terminal by:
   transmits the video data from a first user terminal to the at least one other user terminal via the existing connection from the first user terminal;
   provides instructions for each of a plurality of conditions indicating that the quality of the video data transmitted from the first user terminal via the existing connection is below an acceptable threshold;
   detects at said first user terminal at least one of the plurality of conditions that indicates that the quality of the video data is below an acceptable threshold;
   automatically generates instructions based on the detected condition for a user of the first user terminal, said instructions notifying the user of how to remedy a problem due to the detected condition and intended to provide a humanly implementable remedy to the problem to improve the quality of the video data transmitted from the first user terminal;
   automatically outputs the automatically generated instructions to the user in a humanly comprehensible form; and
   receives an input from a user of the first user terminal responsive to the automatically generated instructions to implement the remedy and thereby improve the quality of the video data transmitted from the first user terminal.

* * * * *